United States Patent
Chang (10) Patent No.: US 7,685,606 B2
(45) Date of Patent: Mar. 23, 2010

(54) POWER SAVING MOBILITY AWARE SYSTEM AND METHOD

(76) Inventor: Ting-Mao Chang, 2126 Villanova Rd., San Jose, CA (US) 95130

( * ) Notice: Subject to any disclaimer, the term of this patent is extended or adjusted under 35 U.S.C. 154(b) by 1485 days.

(21) Appl. No.: 10/518,879

(22) PCT Filed: Jun. 26, 2003

(86) PCT No.: PCT/US03/20596

§ 371 (c)(1),
(2), (4) Date: Dec. 21, 2004

(87) PCT Pub. No.: WO2004/003703

PCT Pub. Date: Jan. 8, 2004

(65) Prior Publication Data

US 2005/0219120 A1    Oct. 6, 2005

(51) Int. Cl.
*G06F 13/00* (2006.01)
(52) U.S. Cl. .................. 719/318; 342/357.08; 455/574; 370/311; 713/320
(58) Field of Classification Search ................. 719/318; 342/357.08; 455/574; 370/311; 713/320
See application file for complete search history.

(56) References Cited

U.S. PATENT DOCUMENTS

| | | | |
|---|---|---|---|
| 6,877,099 B2 * | 4/2005 | Sameshima et al. | 713/324 |
| 6,963,744 B2 * | 11/2005 | Lin | 455/437 |
| 2004/0204184 A1 * | 10/2004 | Lin | 455/574 |

* cited by examiner

*Primary Examiner*—Andy Ho (57) ABSTRACT

A system and method reduces the power consumption by putting the system in sleep and use mobility context receiving device continue to monitor the context and wake up the system when discover the trigger state. After the system waked up, the application executes the job that is triggered by said trigger state. Said job might include reminder, TODO-List warning, e-mail retrieval, computer system or network login, control other appliances, etc. Said mobility context receiving device may also automatically interrupt the said application while the system is powered on. Said mobility context receiving device includes wireless communication interface or positioning device. Said application might be a person sensitive reminder, a TO-DO list warning system, automatic login and e-mail retriever, and automatic appliance controller, proximity sensitive file manager, etc.

25 Claims, 4 Drawing Sheets

FIG 5 ns, such as 802.11b, to establish connec-

POWER SAVING MOBILITY AWARE SYSTEM AND METHOD

FIELD OF INVENTION

This invention related to a mobility aware computing system, and, more particularly, relates to system and method for reducing power consumption of mobility aware computing system.

DESCRIPTION OF PRIOR ART

Many computer systems are design to target the mobile user market, such as mobile phone and personal digital assistant (PDA) that is using Palm OS or Microsoft Pocket PC operating system. These mobile systems provide many daily use applications for mobile users, such as schedule, reminder, to-do list warning applications. Most of commercial applications are only sensitive to the time. For example, the schedule application will notice user when it is time for the scheduled appointment. However, most things in life happen in react to certain environment situation depend on the usage, for which we use the term context. Time is just one of the contexts. There are many other contexts in real life, such as temperature, light condition, "in meeting room", etc. The most important context related to mobile applications is the mobility context that usually categorize into absolute location and relative position, thereafter referred as location context and proximity context respectively. Application that is able to detect the change or existence of some contexts and response to the contexts is referred as context aware application. The context aware application that is aware of mobility context is referred as mobility aware application. The mobility aware application that aware of absolute location is referred as location aware application. The mobility aware application that aware of relative position is referred as proximity aware application. Many research on mobility aware application has been done.

Some applications are aware of the absolute position by using radio wave to determine the absolution location. Most notable application is the navigation system that uses positioning system, such as Global Position System (GPS), to provide the local map and driving direction. U.S. Pat. No. 6,177,905 described a location-triggered reminder for mobile user. The location triggered reminder use a Global Position System (GPS) to position the user's geographic location. Then, user request a remind message when enter a region defined by coordinates and radius information given by user. This system requires a positioning system, for example GPS, to be used with the personal digital assistant that increases the manufacturing cost and battery power consumption. Almost all of these positioning system have limited usage or useless in indoors or tall building down town area. Some applications invent proprietary radio wave transceiver to help determine the position of mobile stations, such Active Badge System by AT&T.

A few applications are aware of relative location, i.e. aware of the presence of other users or actually their mobile device in the proximity. These context aware applications are referred as proximity aware application. Each proximity aware application adopts a discovery method to find each other in the proximity. Some applications equip a proprietary radio wave transceiver to periodically broadcast a device identifier or user identifier and other device in the vicinity can detect its present, for example Proxy Lady System by Victoria Institute in Sweden. Some applications rely on wireless network communication, such as 802.11b, to establish connection. For example, GUIDE system by Lancaster University in U.K. utilizes a cell-based wireless network infrastructure to provide location information to mobile unit. Proem System by University of Oregon in USA is a profile based proximity aware application that defines an application layer protocol on top of existing protocol such as TCP/IP, UDP or HTTP. Proem Systems discover each other after establishing the network connection of an ad hoc network system. After the network connection established, a presence manager in the Proem system is then responsible for announcing its presence and for discovering nearby peers. However, establishing network data connection needs to go through authentication process in higher network protocol layer this be inconvenience to the usage. If relax the authentication process, security problem will be occurred.

Each type of context has many different values or states (thereafter "context state"). For example, temperature is one type of context and 76 degree C. is a state of the context. For the proximity context, "in the vicinity" is a context state and "not in vicinity" is another state. The whole space of a type of context (hereafter "context space") is a set of all possible states in the type of context. Since contexts are dynamic, the context aware application needs to monitor its contexts to provide timely response. Since that, the systems used by the prior arts need to be powered on all the time. However, the application spend most of the time on monitoring the contexts instead of react to the context because the context aware application are only sensitive to and react to some of the special context states (thereafter "trigger state"). Most of the mobile context aware applications are for mobile computing devices that have very limited power resource, such as battery. The context aware applications become impractical if the power consumption did not take into consideration. None of the existing context aware systems addresses this issue.

The computer industry has used variety of power management strategies for reducing the power consumption of computers to preserve our environment. The strategy is from gating the circuit clock, powering off a circuit block in a computer chip, power down a component in a computer, such as hard drive, to shut down the entire computer. The management strategy has been implemented in many different ways, in hardware, in firmware, or in software.

In general, the power management strategy in computer system level is to power down a computer system or part of the system components when it is not in use and restores the power when it is needed for use. To restore the power and then activate the computer system is often referred to "wake up" the computer. Each power management strategy has different wake up method.

For example, user schedule a task to shut down the computer during evening and wake it up at 6:00 am. This approach implements a timer or clock mechanism to monitor the time and shutdown and wake up the computer system at the specified time.

One application that is used to power manage the computer in networks is called "Magic Packet Technology" or "Wake-On-LAN" (WOL). A Wake-On-LAN enabled network interface of a computer system still draws a tiny amount of electricity while the other part of the computer system power off. To wake up the computer system, a specially formed packet is send to the network interface. The specially formed packet contains the network media access control (MAC) address of the receiving network interface that is to be waked up. However, the wake up intend is initiated by the packet sending network interface.

The prior art in power saving method is not enough for the mobility aware application. For example, U.S. Pat. No. 6,177, 905 needs to keep its host system and the sensor alive for continuing monitor the current position and trigger the user task if it falls in a pre-selected area. Proem system also needs to keep the host system and the network interface awake because its presence manager relies on the ad hoc network data link and the network layer, and the network layer usually is performed on the host system. All the prior art in mobility aware application keep the system awake while monitoring the contexts. However, only some states of the contexts needs to be take care by the application. There is no prior art provision a solution in saving the power consumption in host system while continue monitoring or receiving the context and determine when the host system should be waked up. In all the prior arts, the context sensor or receiver, such as GPS receiver and wireless network interface, continue to transport all states in the context space to the context aware application and let application decide how to react to it. This incurs unnecessary activities on the application and the operating system of the system if the context state is not interested to the application.

SUMMARY OF THE INVENTION

A power saving mobility context aware computer system and method is provided. Said context aware computer system is a computer system that contains at least one process unit and at least one mobility context receiving device (MCRD) that is able to detect a mobility context. Said mobility context includes the location context and proximity context. Said location context is related to an absolution position in a referencing position system. Said proximity context is related to the relative position between objects. A link is provided between said process unit and said MCRD to provide means for accessing to a memory in said MCRD. A context aware application that is performed by said process unit selects one or more special conditions of said mobility context (hereafter "trigger condition") and associates one or more tasks to each of trigger conditions. Said application then store said trigger conditions in said memory of said MCRD through said link. Said MCRD is able to detect said mobility context change and signal said application when current state of said mobility context meets the trigger conditions. After receiving said signal, said context aware application performs said one or more tasks that associated with said trigger conditions. Separating context detecting from said application reduces a lot of power consumption and activities on said process unit. To further reduce the power consumption, said process unit may enter a power saving mode if no activity is on said process unit. While powering down said process unit, said MCRD is still active and draws very little of electricity from power supply, such as battery, to perform context detecting. Before said MCRD signals said process unit when finding a matched trigger condition, said signal will bring up the power supply level on said process unit if said process unit is in power saving mode.

A preferred MCRD of the present invention that is aware of location context contains a position receiver, for example a Global Positioning System (GPS) receiver, at least one checker, at least one memory, and an interface controller. Said interface controller receives commands for storing said one or more trigger areas in said memory. Said position receiver continuously or periodically detects the current position of said MCRD. Said checker compares said current position with said trigger areas and generates a signal if said current position is in one of said trigger areas.

A preferred MCRD of the present invention that is aware of proximity context contains a wireless communication interface (WCI) that complies with a communication protocol, for example a Bluetooth or IEEE 802.11, at least one checker, at least one memory, and an interface controller. Said controller receives commands for storing trigger condition on said memory. Said trigger condition is a presence rule of other WCIs. The identifier of each WCI in said presence rule is a trigger identifier. A simple presence rule might contain only one identifier of other WCI. A more complicated presence rule might be a Boolean equation of several identifiers of other WCI. For example, "A & B" is the condition that both WCI A and WCI B are present. In another example, "A & !C" is a condition that the WCI A is present but WCI C get lost, i.e. did not detect for a period of time. Message transmits on wireless media is encoded with one or more identifier fields, for example a transmitter address, a receiver address, etc. Said wireless communication interface continuously or periodically receives message from wireless media and decode identifier fields in the message. Said checker receives one or more identifiers that are decoded from said message and consider those WCIs designated by said received identifier as present. Said checker then evaluate said presence rules and output a signal if exists one presence rule of which the condition meets the current presence of WCIs. In another embodiment, said checker records the last receiving time of a trigger identifier and consider the WCI designated by the trigger identifier as present if the last receiving time of the trigger identifier is within a certain period of time from now.

DRAWING FIGURES

A system and method for a mobility context aware application continue providing the service while reducing unnecessary activity and power consumption. In the following description, for purpose of explanation, numerous of specific details are set forth in order to provide a thorough understanding of the present invention.

DESCRIPTION

As used herein, a context triggered job (hereafter "job") refers to one or group of tasks for which a context aware application schedules to execute when a computer-processing device (hereafter "computing device") detects a trigger state of context. The job, for example, includes sending out a remind message, sending/receiving e-mail, downloading information, sending out control instruction to other devices, such as computers or appliances, etc.

Figure 1:
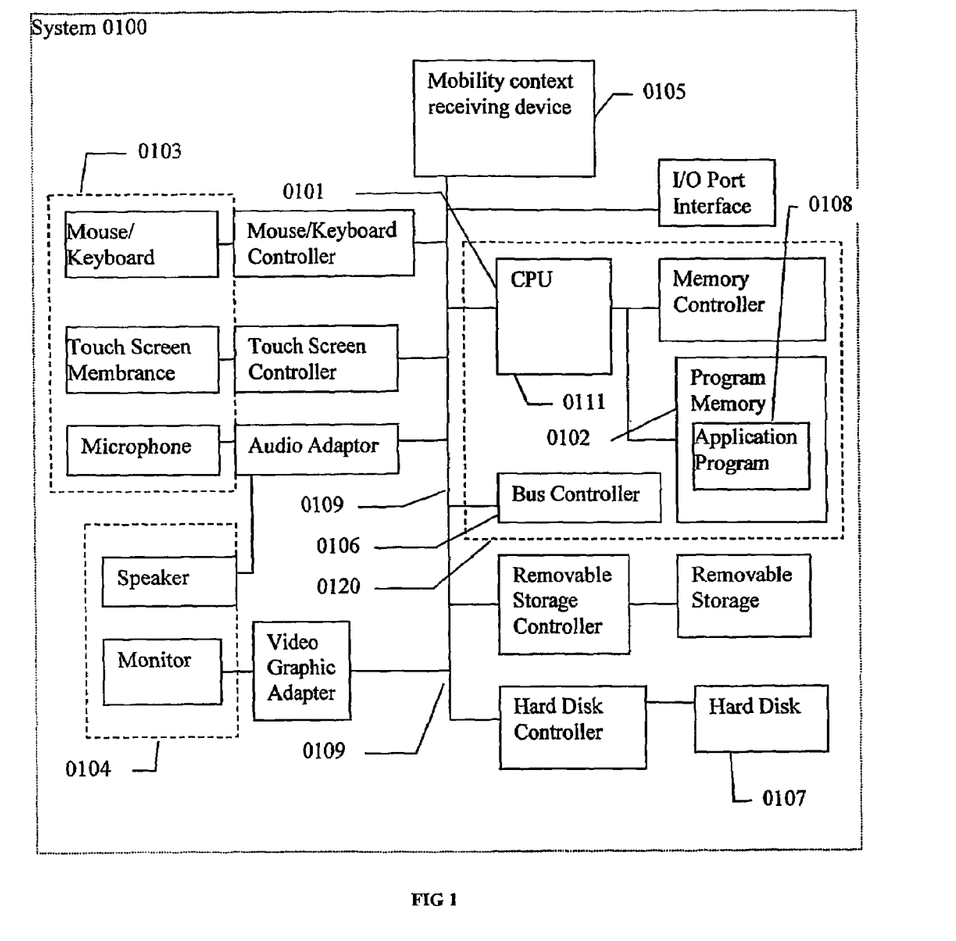
FIG. 1 shows the system of the present invention with a mobile context receiving device or other general components for the present invention.

The System FIG. 1 illustrates an example of said computing device 0100 (hereafter "System") for storing, retrieving, and executing said jobs relating to one or more trigger states of mobility context in accordance with some embodiments of the present invention. The System 0100 is generally implemented using any conventional general-purpose computer having conventional computer components, including at least one processor 0101, program memory 0102, one or more input devices 0103, one or more output devices 0104, at least one mobility context receiving device (MCRD) 0105. In some embodiments, MCRD 0105 is an integrated build-in module in System 0100. In some embodiments, the MCRD 0105 is an add-on card that connects to the system bus 0109 of the System 0100 via a bus controller, for example PCMICA controller; in yet another embodiment, the MCRD 0105 is a stand-alone adapter that is connected to the System 0100 via an I/O port, for example an USB port. The input device may includes mouse, keyboard, touch sensitive screen, or voice recognition module. The output device may include monitor, screen, or speaker module. Processor 0101, program memory 0102, system bus 0109, and bus controller are usually considered as host system 0120 and others are peripherals. In some embodiments, System 0100 is a mobile computing device, such as a personal digital assistant (PDA), a mobile telephone or a portable computer, that may omit one or more components found in conventional general-purpose computers, e.g., hard drive 0107 and keyboard. A context aware application program (hereafter "application") 0108 is generally executed in any conventional operating system, such as Windows Pocket PC, manufactured by Microsoft Corporation of Redmond, and Palm, manufactured by Palm, Inc., of Santa Clara, Calif. Application program 0108 is generally programmed in any conventional general-purpose programming language, such as Java, C, and C++, any combination of general-purpose programming languages, or any combination of a general-purpose programming language and a more specialized programming language, such as a scripting language (Perl). In general, any computing device capable of communicating information to another computing device may be used in various embodiments of the present invention.

Mobility Context

Figure 2:
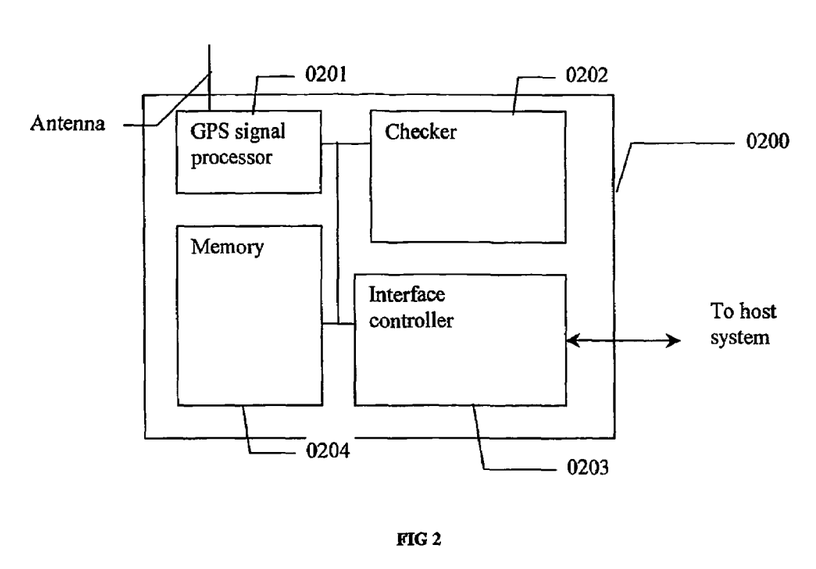
FIG. 2 shows an embodiment of the present invention that is aware of the location context, absolute position information.

Said mobility context includes location context and proximity context. The location context is the location of the system of the present invention in a referencing position system. The proximity context is the proximity relation between the system of the present invention and other objects or systems Location Aware MCRD FIG. 2 illustrates a preferred embodiment of the present invention that aware of location context. Said embodiment includes of a host system and a location aware MCRD. Said MCRD connected to host system through a link, which is an I/O bus. Said MCRD 0200 includes of a GPS signal processor 0201, a checker 0202, an interface controller 0203, and a memory 0204. Said signal processor received signals from multiple satellites and determines its position by triangulation method. A position is usually composed of longitude, latitude, and altitude. A context aware application 0108 on said host system 0120 receives one or more jobs and a trigger area for each of said jobs from user or other application. Said application 0108 then instructs said interface controller 0203 through said bus to store said trigger areas in said memory 0204. Said signal processor 0201 continuously or periodically calculates and updates the current position. Said checker 0202 then compares said current position with said trigger areas in said memory 0204. When said current position falls in any of said trigger areas in said memory 0204, said checker 0202 generates a trigger signal to notify said application 0108. Said MCRD 0200 and the host system 0120 can enter power saving mode independently. Said power saving mode means to power down or enter sleep mode with low or no activities. To reduce power consumption, said host system 0120 might enter power saving mode when it has no activity. Before notifying said application 0108, trigger signal might first wake up host system 0120 if host system is in power saving mode. Said application 0108 might register an interrupt service on said host system 0120. Host system 0120 executes said interrupt service when receives said trigger signal. Said interrupt service retrieves triggered trigger areas and pass to said application 0108. In another embodiment, said interrupt service may retrieve said current position and application find triggered trigger area by itself. After receiving triggered trigger area, said application 0108 executes said jobs that associate with the triggered trigger area. With the interrupt service, said application 0108 could response quickly to the context change and without introducing unnecessary activities for monitor the context. Said trigger area information may further include an identifier, for example a number, given by the context aware application. The interrupt service may just notify the context aware application with one or more identifiers of triggered trigger area.

In the example of FIG. 2, the MCRD is a GPS receiver that is a positioning device. However, any positioning device could be used as the MCRD for detecting location context in the present invention. The MCRD may implement any of positioning technology that is well known to those skilled in the art. The positioning technology includes handset-based, handset-assisted, network-based, and network-assisted, positioning technology. In handset-based technology, the system performs position calculation autonomously, such as Global Positioning System (GPS). In handset-assisted technology, the system performs some assistance for positioning, while network (or servers on network) performs actual position calculation, such as Enhanced Observed Time Difference (E-OTD). In network-based technology, the network performs the actual position calculation, such as Time of Arrival (TOA). In the network-assisted technology, the network provides some assistance in positioning, while the system performs the position calculation, such as A-GPS. The MCRD that implements handset-based and network-assisted technology could calculate and update its position autonomously. However, the MCRD that use the handset-assist and network-based technology usually has communication capability that updates its current position by receiving the position from network. After updating it current position, the processor on any kinds of location aware MCRDs will compare the current position with said trigger areas. If said current position falls in one or more trigger areas, said checker on the MCRD will raise trigger signal to a wake up the host system in sleep mode and notify said application.

In yet another embodiment, the position coordinates are transmitted in a communication protocol header, for example the PicoRadio developed at University of California Berkeley. The address of a node in PicoRadio network is defined as a triplet includes location coordinates, node type, and data type. The embodiment retrieves the location coordinates from the protocol header of data frames sent by nodes in proximity. The embodiment might use a MCRD that implemented the PicoRadio network interface to receive coordination of nearby network interfaces and calculates its current absolute location.

Proximity Aware MCRD

Figure 3:
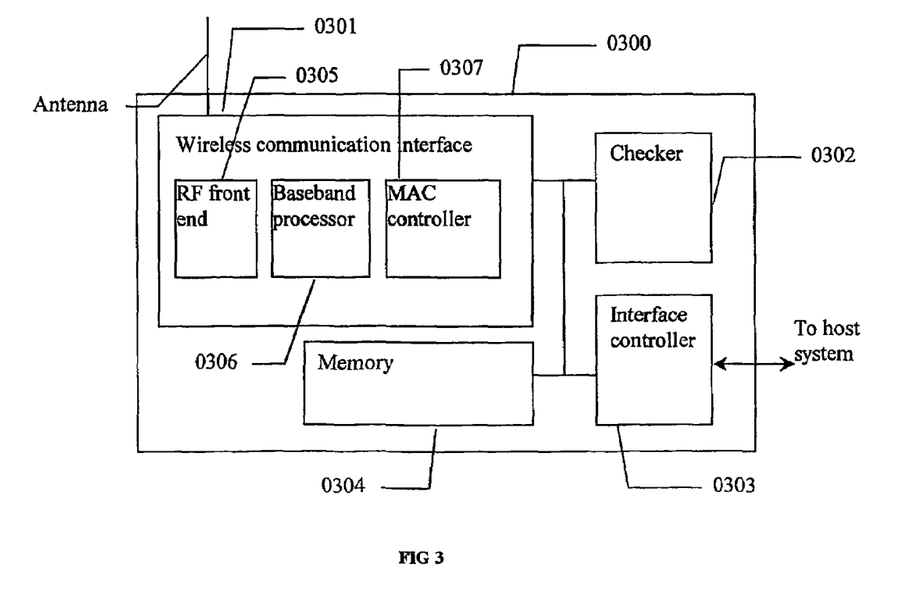
FIG. 3 shows an embodiment of the present invention that is aware of the proximity context, relative position information.

FIG. 3 illustrates a preferred embodiment of the present invention that aware of proximity context. Said embodiment includes of a host system 0120 and a proximity aware MCRD 0300. Said MCRD 0300 connected to host system 0120 with a PCMCIA port to system bus. Said MCRD 0300 includes an IEEE 802.11b wireless communication interface (WCI) 0301, a checker 0302, an interface controller 0303, and a memory 0304. Said WCI 0301 includes a radio frequency (RF) front end 0305, a baseband processor 0306, a media access control (MAC) controller 0307. Said RF front end 0305 receives RF signal and down convert into lower frequency analogy signal and pass it to baseband processor 0306. Said baseband processor 0306 demodulates said analogy signal into physical layer data frame, then decodes and passes a MAC frame in said physical layer data frame to MAC controller 0307. To distinguish all WCI and control their access right to a wireless media, each WCI is given an identifier. Said identifier is a MAC address in MAC sub layer protocol. The format of said MAC frame includes a header field and other data fields. A MAC frame header may includes one or more identifier fields, such as receiver address, transmitter address, source address, destination address, or BSSID, etc. The BSSID is the MAC address of an access point. Said MAC controller 0307 decodes said MAC frame, and passes the data unit of said MAC frame to other protocol layer if the destination or receiver address is addressed to WCI 0301 or a group address addresses that includes WCI 0301. Because of limited operation range, the WCI 0301 can only receive data that transmit on wireless media by other WCI in proximity. Since that, said transmitter address of said MAC frame discloses the identifier of another WCI in proximity. The receiver address further suggests yet another WCI that is designated by said receiver address is also close to the WCI 0301. The BSSID also suggests an access point in proximity. These MAC address fields of said MAC frame are the context interested to said context aware application 0108, and a trigger state of said context refers to one or more of said MAC addresses of other WCI that application wish to detect. Said application 0108 on said host system 0120 receives a request for executing a job and its trigger condition from user or other application. Said trigger condition is a presence rule of other WCIs. A simple presence rule might includes one identifier of other WCI. A more complicated presence rule might be an equation, such as Boolean equation, of several identifiers of other WCIs. The identifier of each WCI in said presence rule is a trigger identifier. Said presence rule might be given an identifier (thereafter "callback identifier"), for example a number, a job identifier, a rule identifier, or said trigger identifier, for telling application 0108 which presence rule is triggered. Said application 0108 commands said interface controller 0303 through said bus to store said presence rule in said memory 0304. Said MAC controller 0301 continuously or periodically receive MAC frame and decodes the MAC frame and said checker 0302 receives one or more identifiers in said identifier fields of MAC frame from said MAC controller 0307. Said checker 0302 considers the WCI designated by received identifier as present and evaluate said presence rules. A presence rule is triggered if the presence of trigger WCIs or trigger identifiers meets the requirement of the rule. Said checker then output a signal if exists one presence rule that is triggered. In another embodiment, said checker might record the last receiving time of a trigger identifier and consider the WCI designated by the trigger identifier as present if the last receiving time of the trigger identifier is within a certain period of time from now. Said MCRD 0300 and the host system 0120 can enter power saving mode independently. Said power saving mode means to power down or enter sleep mode with low or no activities. To reduce power consumption, said host system 0120 might enter power saving mode when it has no activities. Before notifying said application 0108, trigger signal might first wake up host system 0120 if host system is in power saving mode. Said application 0108 might register an interrupt service on said host system. Host system 0120 executes said interrupt service when received said output signal. Said interrupt service retrieves triggered trigger identifier or triggered presence rule or its rule identifier and pass it to said application 0108. In another embodiment, said interrupt service may just interrupt said application 0108 and said application retrieve triggered trigger identifier or triggered presence rule or its rule identifier from MCRD 0300 by commanding said interface controller 0303. Then, said application 0108 evaluates presence rules with received trigger identifier and executes the jobs of which presence rule is evaluated to be true or the presence rule is received from MCRD 0300. To detect more presence condition, said checker 0302 may further schedule a timer to reevaluate the presence rule, so an absent WCI can be detected on time if said latest receiving time is recorded and it is within certain a period of time from now.

In another embodiment, WCI 0300 complies with Bluetooth protocol. The trigger identifier is the Bluetooth device address (BD_ADDR) or its lower address part (LAP). The identifier of other WCI in proximity could be detected from the access code of each received packets or from the BD_ADDR of received FHS packet. The access codes include Channel Access Code (CAC), Device Access Code (DAC), and Inquiry Access Code (IAC). The identifier to be discovered in CAC is the LAP of the master of the piconet. The identifier to be discovered in DAC is the LAP of a slave of the piconet. In other embodiments, said wireless communication interface might comply with other proprietary protocols or industrial communication protocols, for example Bluetooth, CDMA, GSM, GPRS, RFID, IrData, UWB, etc.

In yet another embodiment, said WCI 0300 further includes a TCP/IP offload engine (TOE) that process TCP/IP protocol stack in dedicated hardware. Said trigger identifier is an IP address in the TCP/IP protocol. This can be useful when said IP address is a static mobile IP address.

To further reducing the power consumption, in yet another embodiment, the MCRD 0300 or MCRD 0200 is powered down or entering power saving mode periodically and be waked up by a timer in a predetermined time to perform the context receiving tasks.

In some embodiments, the MCRD 0300 includes a way to help other systems discover MCRD 0300 itself, for example broadcasting the identifier of WCI 0300. For example, said MAC controller 0307 may periodically send out a packet or frame that contains its identifier, an MAC address, to expose its identity. The packet or flame could be broadcasted or designated to any system because other systems of the present invention can detect the identifier from the packet or frame. User could certainly choose not to expose the system for security or privacy reason.

A preferred method to expose the identifier of WCI 0301 is by sending out a packet or frame that addresses to WCI 0301 itself. It could reduce the impact to other peers that has no concern about this identifier. The sender itself may ignore the message that sends out by itself. In fact, most of the wireless front end, such as RF front end 0305, use the same set of antenna for sending and receiving signal and can perform either in transition mode or in receiving mode, so the receiver will not hear the packet by nature.

In another embodiment, to release an identifier to others is on demand. For example, user A would like to tell user B his identifier for user B to discover him later. The WCI of user A could send out a special packet, for example the Request To Send (RTS) packet in IEEE 802.11b, that set both transmitter address and receiver address to the MAC address of the WCI of user A. Both users could press a button or give an instruction almost at the same time to release and capture the identifier. Right before or after user B press the button; the WCI of user B receives a packet with same transmitter address and receiver address. The packet received by the WCI of user B is highly possible to be the packet send by WCI of user A. Since that, the identifier of the WCI of user A reaches the user B. User can change the time delay tolerance between user B press button and received the packet.

In yet another embodiment, a wireless network server is set up for discovering the systems in vicinity and stores them in its memory. The server may periodically broadcast a message, for example every 1 minute, to indicate its presence. The system of the embodiment of the present invention may query the server for discovery other systems in the vicinity. When the server receives the query, the server discovery the system's presence and replies the list of the system in vicinity. The system of the embodiment decoded the list of received address and compared with the trigger addresses. If the list of received address intersect with the set of the trigger address in memory of the network interface, i.e. exist one address in the received list is a trigger address, the network interface wake up the system. If there is no intersection, the network interface card when to sleep but the network interface needs to wake up periodically to update server its presence. Otherwise, the server may delete the system from its list if the system did not update for a period of time.

Use Multiple Mobility Contexts

Figure 4:
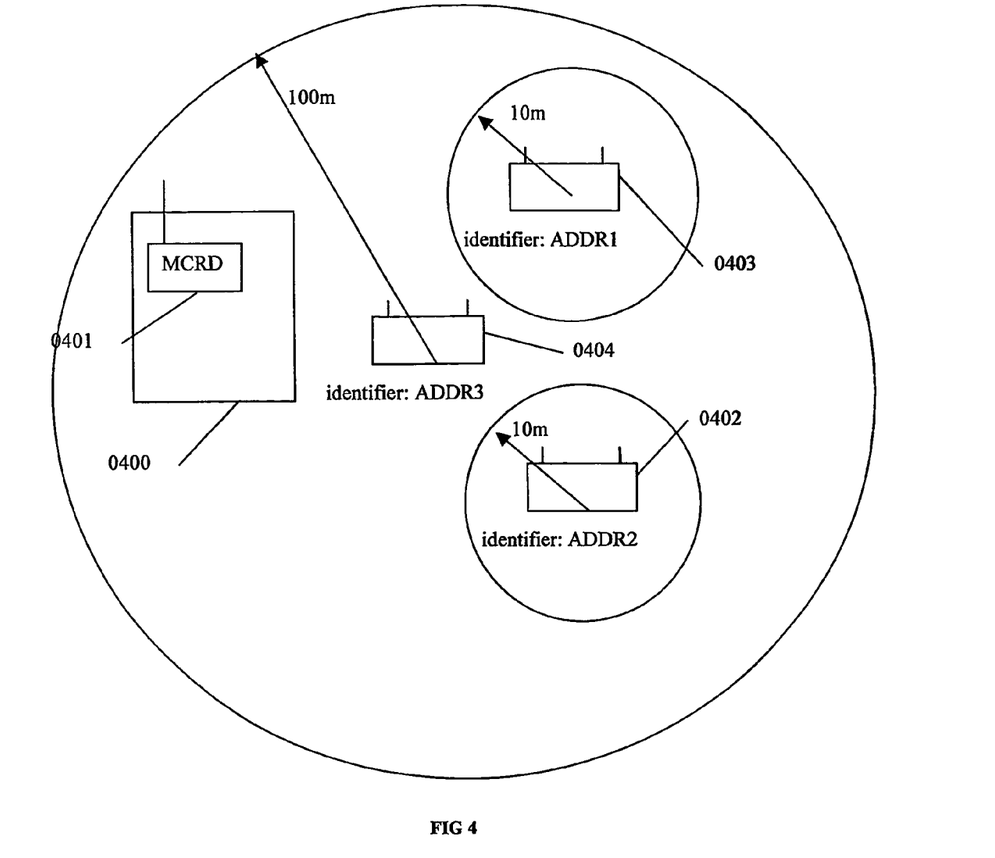
FIG. 4 shows a MCRD with dual mode WCI that complied with IEEE 802.11b and BlueTooth Technology.

FIG. 4 illustrates an embodiment 0400 of the present invention that includes a dual mode WCI 0401 that implements multiple protocols, IEEE 802.11b and Bluetooth. A Bluetooth equipped printer 0402 and a vending machine 0403 are in a static location that is within the operation range of an IEEE 802.11b access point 0404 that is also in static location. Because Bluetooth protocol has shorter operation range than IEEE 802.11b, the identifier of device 0402 and 0403 can be enable only when identifier of access point 64 is present. Since that, the present of trigger identifier of access point 0404 enables the trigger identifier of device 0402 and 0403. Otherwise, trigger identifiers of device 0402 and 0403 are disabled. Since that, a trigger state can be enabled or disabled by another trigger state in the present invention. In another embodiment, a MCRD might include a GPS receiver or GSM transceiver. So, the contexts received by multiple MCRD forms a more complicated context.

Flow of the Present Invention

Figure 5:
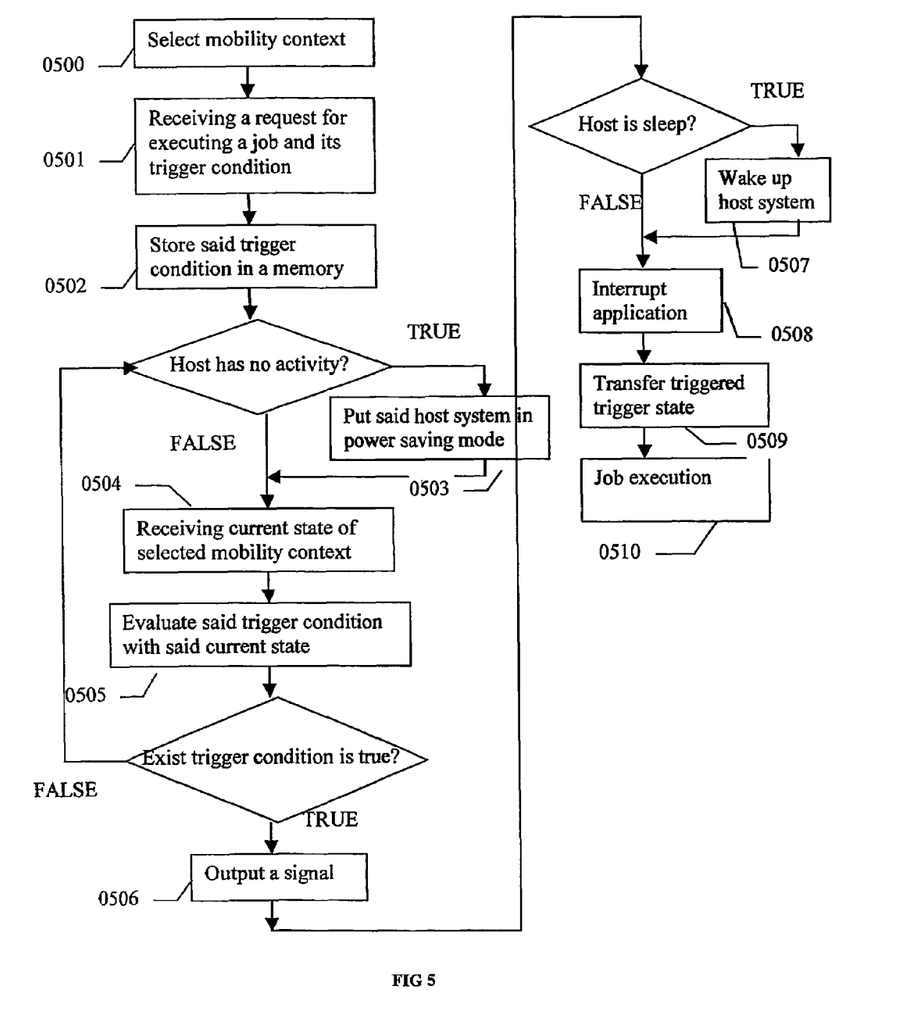
FIG. 5 shows a method for saving the power of mobility aware system 0100, according to some embodiments of the present invention.

FIG. 5 illustrates a method of saving the power of mobility aware system 0100, according to some embodiments of the present invention. In stage 0500, select mobility context that is to be detected. Said mobility context could be location context, proximity context, or both. For location context, it is to select a referencing position system, for example the positioning system of GPS. For proximity context, it is to select the communication protocol, for example IEEE 802.11g, and the identifier for each WCI (thereafter "sensor WCI") of which the context is to be detected. Said sensor WCI is preferred to move together with said host system.

In stage 0501, receive a request for executing a job and the trigger condition of said job by a context aware application 0108 on said host system 0120. Said job includes one or more tasks, such as instructions for login to network with a given password, retrieve emails, and read e-mails with text-to-speech application, etc. Said trigger condition defines a trigger state in the mobility context, wherein said job will be executed if the current state in said mobility context equals to or falls in said trigger states. Said trigger state in location context is an area (thereafter "trigger area") in said positioning reference system. Said trigger state in said proximity context is a presence rule of one or more WCI (thereafter "trigger WCI") that are not sensor WCI. The identifier of each trigger WCI in said presence rule is a trigger identifier. A WCI in said presence rule is present if its identifier is received within a certain period of time, otherwise is absent.

In stage 0502, store said trigger condition in a memory. For location context, said trigger area is stored in said memory. For proximity context, said presence rule is stored in said memory. A complicated presence rule could further decompose into simple presence rule, for example only one trigger identifier in each small rule, and store the simple rules, i.e. trigger identifiers, in said memory. Said trigger condition could further associate with an identifier (thereafter "callback identifier") and be stored in said memory. Said callback identifier could be a number, a rule identifier, a job identifier, or trigger identifier itself.

In stage 0503, put said host system in power saving mode if said host system has very low or no activities. Said power saving mode means put the system into hibernated power state, suspended power state, or any power saving state known to those skilled in the art. There are many conventional ways to put the system into power saving mode, either manually switch by user or automatically enter by the operating system.

In state 0504, receive current state of selected mobility context. For location context, the current state is a position in said referencing position system that is received by a positioning receiver, such as GPS. For proximity context, the current state is the current detected identifiers that are decoded from a message that is received and processed by said sensor WCI. For example, the identifiers are in receiver address field and transmitter address field of IEEE 802.11b MAC frame. The process of said context receiving is known to the skilled in the arts. For example, the GPS signal processor 0201 receives signal from multiple satellites and performs triangulation method to determine the current position. For example, the IEEE 802.11 WCI 0301 decodes the message and determines the message is designated to WCI 0301. A message designates to WCI 0301 including broadcasting message, such as Address Resolution Protocol (ARP) request and WOL magic packet, and the message directly address to WCI 0301. WCI 0301 might pass the data unit of these kinds of packet to upper layer of protocol that handles by host system.

In stage 0505, evaluate said trigger condition with said current state. For location context, a trigger condition is true is if said current position falls in said trigger area. For proximity context, a trigger condition is true if the presence of said trigger identifiers meet the requirement of said presence rule. Said trigger identifier is present if it is received within a certain period of time, otherwise is absent. In other embodiment, further mark the trigger condition that is true, for example mark a time stamp.

In stage 0506, output a signal if one of said trigger conditions is true.

In stage 0507, wake up host system that is in power saving mode after power control circuit receiving said output signal.

In stage 0508, interrupt or bring up said context aware application.

In stage 0509, transfer triggered information to said application. Said triggered information might be said callback identifier or said trigger state that has true value.

In stage 0510, Said application executes said jobs that associate with said triggered information, such as callback identifier and trigger state that has true value. Said application will use received trigger information to further evaluate complicated trigger conditions and execute the associated jobs if the conditions are true.

In yet another embodiment, the system may perform trigger state conversion that converts a trigger state to an analog trigger state in another context. For example the embodiment of FIG. 2, user may specify the sensitive area in a street address. The system converts the street address into the relative GPS coordinates, then store the coordinates and a radius into said memory 0204. For example the embodiment of FIG. 3, user or the context application uses the Internet Protocol (IP) address as the sensitive context, the system use Address Resolution Protocol service to convert the IP address to MAC address. Then, the system store the trigger MAC address in the memory on WCI 0301. With the context conversion, the user or context application can use the understandable context instead of limit to the low level of context that understands by the MCRD.

CONCLUSION, RAMIFICATIONS, AND SCOPE

The present invention reduces the power consumption by putting the system in sleep and use mobile context receiving device continue to monitor the context and wake up the system when discover the trigger state After the system waked up, the application executes the job that triggered by the trigger state. The user of the present invention can be requested to perform many different tasks in a job, such as trigger an alarm message, exchange e-mail with mail server, retrieve meeting material from a file server, browse a web page, control a equipment or device, etc. So application can be a person sensitive reminder, a TO-DO list warning system, automatic login and e-mail retriever, and automatic appliance controller, proximity sensitive file manager, etc.

Although the description above contains many specific details, these should not be construed as limiting the scope of the invention but as merely providing illustrations of some the possible embodiments of the invention.

Thus, the scope of the invention should be determined by the appended claims and their legal equivalents, rather than by the examples given.

I claim:

1. A method for a computer peripheral device of a computer system to monitor at least one proximity context and response to said proximity context change, the method comprising:
   receiving information related to at least one trigger condition;
   storing said trigger condition in said device;
   monitoring current state of said proximity context, wherein said proximity context is related to the presence of one or more wireless communication interfaces in proximity of said device;
   evaluating trigger condition based on said current state; and
   outputting a signal to change the power saving state of a part of said computer system if said current state satisfies the criteria of said trigger condition.

2. The method of claim 1, wherein said changing the power saving state is to wake up said computer system.

3. The method of claim 1, wherein said signal further interrupts said computer system for executing a job that is associated with said trigger condition.

4. The method of claim 1, wherein said information further comprises a callback identifier that is associated with said trigger condition, and said callback identifier is send to said computer system if said current state satisfies the criteria of said trigger condition.

5. The method of claim 1, wherein said information is related to multiple trigger conditions and one trigger condition is used to enable or disable another trigger condition.

6. The method of claim 1, wherein said monitoring current state further comprising:
   receiving message on wireless media; and
   decoding said message according to a communication protocol, wherein a wireless communication interface becomes present in proximity of said device if the identifier of this wireless communication interface is decoded from said message.

7. The method of claim 6, wherein said trigger condition comprises a rule related to the presence of one or more pre-selected peer wireless communication interfaces and each has an identifier.

8. The method of claim 7, further comprising recording the individual last detecting time of said pre-selected peer wireless for deriving the individual absence of said pre-selected peer wireless communication interfaces.

9. The method of claim 7, wherein said identifier pertains to the physical link mechanism or the medium access control mechanism of said communication protocol.

10. The method of claim 9, wherein said identifier is a media access control address.

11. The method of claim 7, wherein said identifier pertains to the network layer of said communication protocol or the upper layer.

12. The method of claim 11, wherein said trigger identifier is an Internet protocol (IP) address.

13. A computer peripheral device of a computer system to monitor at least one proximity context and response to the change of said proximity context, the peripheral device comprising:
   at least one receiver for receiving information related to the current state of said proximity context, wherein said proximity context is the presence of one or more wireless communication interfaces in proximity of said device;
   at least one trigger condition that defines a trigger state of said proximity context;
   a memory for storing said trigger condition; and
   a checker configured to evaluate said trigger condition based on said current state and output a signal to change the power saving state of a part of said computer system when said current state meet the criteria of said trigger condition.

14. The device of claim 13, wherein said changing the power saving state is to wake up said computer system.

15. The device of claim 13, further comprising a bus interface for connecting to a bus of said computer system.

16. The device of claim 13, wherein said signal interrupts said computer system for executing a job that is associated with said trigger condition.

17. The device of claim 13, further comprising a callback identifier that associates with said trigger condition, wherein said callback identifier is stored in said device and is transmitted to said computer system when said trigger condition is satisfied.

18. The device of claim 13, further comprising a second trigger condition, wherein the first said trigger condition can be enabled or disabled when said current state satisfies the criteria of said second trigger condition.

19. The device of claim 13, wherein said receiver contains a processor configured to decoding message on wireless media according to a communication protocol, wherein a wireless communication interface becomes present in proximity of said device if the identifier of this wireless communication interface is decoded from said message.

20. The device of claim 19, wherein said trigger condition comprises a rule related to the presence of one or more pre-selected wireless communication interfaces in proximity of said device and each have an identifier.

21. The device of claim 20, further comprising means to record the individual last detecting time of said pre-selected wireless communication interfaces for deriving the individual absence of said pre-selected wireless communication interfaces.

22. The device of claim 20, wherein said identifier pertains to the physical link mechanism or the medium access control mechanism of said communication protocol.

23. The device of claim 22, wherein said identifier is a media access control address.

24. The device of claim 20, wherein said identifier pertains to the network layer of said communication protocol or the upper layer.

25. The device of claim 24, wherein said identifier is an Internet protocol (IP) address.

* * * * *